United States Patent [19]

Goar

[11] Patent Number: 4,552,747

[45] Date of Patent: Nov. 12, 1985

[54] TEMPERATURE MODERATION OF AN OXYGEN ENRICHED CLAUS SULFUR PLANT

[75] Inventor: B. Gene Goar, Tyler, Tex.

[73] Assignees: GAA Engineered Systems, Inc., Tyler, Tex.; Air Products and Chemicals, Inc., Allentown, Pa.

[21] Appl. No.: 622,433

[22] Filed: Jun. 20, 1984

[51] Int. Cl.[4] .............................................. C01B 17/02
[52] U.S. Cl. ................................. 423/574 R; 423/242; 423/DIG. 6
[58] Field of Search .......... 423/242 R, 574 R, DIG. 6

[56] References Cited

U.S. PATENT DOCUMENTS

| | | |
|---|---|---|
| 3,822,341 | 7/1974 | Smith ................................... 423/574 |
| 4,153,674 | 5/1979 | Verloop et al. . |
| 4,212,817 | 7/1980 | Schmid et al. ............... 423/DIG. 6 |
| 4,212,855 | 7/1980 | Kerner et al. ........................ 423/522 |
| 4,279,882 | 7/1981 | Beavon . |

*Primary Examiner*—John Doll
*Assistant Examiner*—Robert Alway
*Attorney, Agent, or Firm*—Geoffrey L. Chase; E. Eugene Innis; James C. Simmons

[57] ABSTRACT

A process and system are set forth for improving an oxygen-enriched Claus plant by recycling effluent from the first condenser back to the reaction furnace to moderate oxygen induced high temperatures and thus allow additional oxygen-enrichment and attendant throughput in the Claus plant.

12 Claims, 1 Drawing Figure

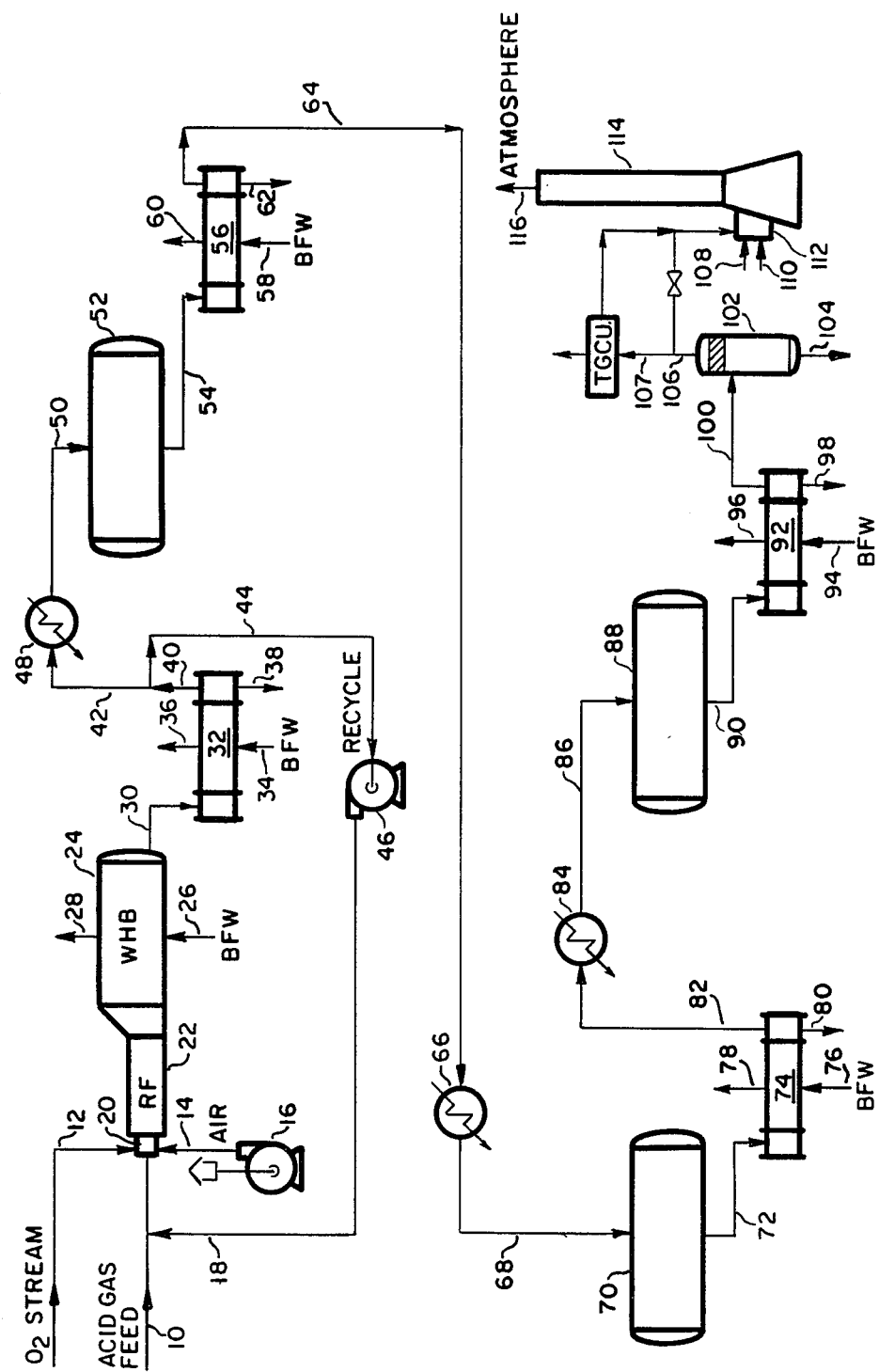

TEMPERATURE MODERATION OF AN OXYGEN ENRICHED CLAUS SULFUR PLANT

TECHNICAL FIELD

The present invention is directed to the recovery of elemental sulfur from hydrogen sulfide containing gas streams. More specifically, the present invention is directed to improvements in a Claus sulfur plant using oxygen enrichment and recycle gases to increase capacity and moderate flame temperatures in the reaction furnace.

BACKGROUND OF THE PRIOR ART

It is known in the prior art to recover elemental sulfur from hydrogen sulfide containing gas streams as is set forth in the article "Fundamentals of Sulfur Recovery by the Claus Process" by B. Gene Goar, published in the 1977 Gas Conditioning Conference Report.

It is also known to use oxygen enrichment in the operation of a Claus sulfur plant in order to increase the capacity of hydrogen sulfide handled as well as the total throughput of the plant as set forth in the article "Oxygen Use in Claus Sulfur Plants" by M. R. Gray and W. Y. Svrcek published in the 1981 Gas Conditioning Conference Report. In that article it was disclosed that oxygen can be added to the air feed to the burner of the reaction furnace in order to increase the amount of hydrogen sulfide which is combusted to sulfur dioxide for later catalytic conversion with additional hydrogen sulfide to the elemental liquid sulfur product of the Claus process. The article recites that the maximum capacity increase which can be achieved with oxygen enrichment is determined by the pressure drop through the plant and the reactor space velocities. However, a further limitation set forth in the article is that for a given plant stream, temperatures and sulfur condenser capacity may limit the potential capacity increase using oxygen enrichment. Specifically, stream temperatures in the reaction furnace and in the converter beds may increase due to oxygen enrichment and in fact such increase from oxygen enrichment reaches the maximum tolerable temperature of the materials used in such a furnace, namely the refractory lining.

In the 1983 publication by Linde of Union Carbide entitled "Claus Plant Oxygen Enrichment", it is noted that oxygen-enrichment limitations exist for rich $H_2S$ streams due to temperature limits in the furnace or waste heat boiler of a Claus plant.

U.S. Pat. No. 3,822,341 describes a Claus plant using oxygen enrichment in which one source of oxygen is initially used to strip residual $SO_2$ from a sidestream in vessel 92 before the oxygen stream in line 96 is optionally recycled to be included with the oxygen in line 12 going to the combustion zone of the waste heat boiler 8. As recited at col. 5, lines 65-68 of the specification. Because the oxygen content of such a stream is completely consumed in an exothermic reaction this stream can not be utilized as a moderating medium for the flame temperature of the reaction furnace. As described by Goar, Claus sulfur plants typically have an adiabatic reaction furnace followed by a waste heat boiler. The excessive temperature problem with oxygen enriched operation occurs in the adiabatic furnace. U.S. Pat. No. 3,822,341 ignores the existence of this problem.

U.S. Pat. No. 4,153,674 discloses a Claus plant and tailgas cleanup plant wherein a gas stream in line 20 is removed from the tailgas system and is returned or recycled to the front end of the Claus plant 7. This patent does not consider oxygen enrichment or flame temperature moderation by a recycle stream. Also the tail gas is reacted to convert all sulfur to hydrogen sulfide which is absorbed, stripped and returned to the Claus plant.

The present invention overcomes the shortcomings of the prior art by increasing throughput of a Claus plant by oxygen enrichment to an extent beyond that contemplated in the prior art due to flame temperature limitations. This is achieved by the recycle of an intermediate gas stream from the first condenser in the Claus train to moderate the temperature in the flame of the burner of the reaction furnace.

BRIEF SUMMARY OF THE INVENTION

The present invention is directed to a process for recovering sulfur from a feed gas stream rich in hydrogen sulfide wherein the gas stream is partially combusted with an oxygen-enriched gas in a Claus reaction furnace, the combustion effluent is cooled with the attendant condensation and separation of sulfur in the first condensation zone and the remaining effluent stream is passed through at least one stage of reheating, conversion in a catalytic Claus reaction zone and cooling with attendant condensation and separation of sulfur in an additional condensation zone, wherein the improvement comprises recycling a portion of the effluent stream from the first condensation zone to the reaction furnace zone to moderate the temperature of the reaction furnace zone.

Typically the process uses three stages of reheating, conversion and cooling and separation subsequent to the first condensation zone.

The process is relevant for hydrogen sulfide containing streams wherein the sulfide is in the range of 60 to 100 mole %. Preferably the hydrogen sulfide content of the feed gas is 80 to 100 mole %.

Preferably the oxygen enrichment of the reaction furnace is in the range of 32 to 90 mole %, more specifically 40–75 mole %.

The recycle stream flow rate should be in the range of 5 to 60% of the combustion effluent stream from the first condensation zone.

Preferably the temperature of the reaction furnace zone is maintained in the range of 2400° to 2800° F.

The invention also is directed to a system for recovering sulfur from a feed gas stream rich in hydrogen sulfide by the Claus reaction including a reaction furnace for partially combusting the feed gas stream with an oxygen enriched gas, a first condensing means for cooling and condensing sulfur from the combustion effluent, at least one train comprising a reheater means, a catalytic Claus reactor and an additional condensing means, means for rewarming, further reacting and recovering sulfur from said effluent, wherein the improvement comprises recycle means for recycling a portion of the effluent from said first condensing means to said reaction furnace.

Preferably the system has a recycle means constituting a conduit just downstream of the first condenser for recycling a portion of the combustion effluent gas through the conduit and delivered by a recycle blower through a subsequent conduit to the reaction furnace of the Claus plant system.

BRIEF DESCRIPTION OF THE DRAWING

The drawing is a schematic representation of the oxygen-enrichment and effluent recycle embodiment of a Claus plant.

DETAILED DESCRIPTION OF THE INVENTION

Claus sulfur recovery systems are widely utilized to recover sulfur from acid gas streams produced in natural gas purification and in petroleum refineries primarily from amine sweetening. In refineries the hydrogen sulfide is in the crude oil and is contained in hydrocarbon desulfurization unit off gases and fluidized catalytic cracker unit off gases. Often times the acid gas stream produced from the amine unit is quite rich in hydrogen sulfide, particularly in petroleum refineries may be 80–95 mole % hydrogen sulfide. Also in many refineries, the Claus plant units are either fully loaded or subject to becoming fully loaded (capacity limited) due to the processing of heavy crude oils which contain relatively large amounts of sulfur compounds. With the dwindling known reserves of refinable hydrocarbons and crude oils, less attractive known oil reserves are now being processed which less attractive oil reserves typically have high sulfur contents. The trend in refining such high sulfur containing feedstocks will increase in the future. Therefore a method for increasing the capacity of Claus plants to process sulfur is needed.

As Claus sulfur recovery unit feed rates are increased above capacity several problems develop. At increased flow the pressure drop through the Claus plant and tail gas cleanup unit increases and the back pressure increases required $H_2S$ and air feed inlet pressures beyond what is available from the amine regenerator that supplies the $H_2S$ feed and the air blower that provides feed air. The increased flow also increases the space velocity in the reaction furnace and the catalytic reactor stages which reduces conversion to sulfur and increases emissions to the tail gas cleanup unit. The increased flows to the tail gas cleanup unit increases its pressure drop and further lowers tail gas sulfur recovery to give increased and usually unacceptable sulfur emissions. The increased back pressures may in some Claus plants pose the risk of blowing the liquid sulfur drain seals which would release noxious, toxic $H_2S$ into the area. While booster blowers for the $H_2S$ and air feeds, and higher pressure sulfur liquid drain seals can provide some increase in capacity the reduced sulfur conversion and increased sulfur emissions remain.

One method which may be used to increase the capacity of an existing Claus plant is the use of oxygen to enrich the air stream to the reaction furnace of the plant from 21 mole % oxygen which is the content of air, up to 70–90 mole % oxygen or higher. Any increase in oxygen content of the air stream effectively reduces the nitrogen content of gases passing through the Claus plant and increases its throughput capacity for sulfur by diminishing the gas volume of inerts, namely nitrogen which must also be passed through the equipment. Typically, a Claus plant handling 80–95 mole % hydrogen sulfide acid gas needs an increase in capacity of 40–60%, yet only enough oxygen can be added to the air stream to get a 10–15% increase in capacity because flame temperature limitations of the fire brick and refractory in the reaction furnace limit the amount of oxygen which may be added. This results because of the increase in flame temperature when oxygen is added to the air stream.

If the acid gas stream contains 90 mole % hydrogen sulfide and the Claus plant is performing a typical burn of only one third of the hydrogen sulfide (one third of fully stoichiometric air requirements) and the burner is receiving air (21 mole % oxygen) then the calculated theoretical adiabatic flame temperature should be about 2400° F. If the air stream is enriched with oxygen to 40 mole % oxygen, the calculated adiabatic theoretical flame temperature should increase to about 3150° F. Again, if the air stream is enriched with oxygen, but this time to 70 mole % oxygen, the calculated theoretical adiabatic flame temperature should increase to about 3750° F. However, most better quality fire brick and refractory material installed in Claus plant reaction furnaces are good for a maximum continuous operating temperature of only 2700° to 2800° F. if they have an alumina content of 85–90 wt % or greater. Therefore, it may be seen from the above calculations that only a limited oxygen enrichment, 30–32 mole % oxygen of the airstream can be used and still hold the temperature below a maximum of 2800° F. With the small reduction of nitrogen input when increasing the air stream oxygen content from 21–32 mole % oxygen, only a slight increase in Claus plant capacity is realized, approximately 12 to 15% capacity.

The present invention however, permits increasing the oxygen enrichment to above 32 mole % to increase capacity of an existing Claus sulfur recovery unit further by recycling combustion effluent, after cooling to separate sulfur liquid, to moderate the reaction furnace temperature to avoid excessively high temperature. In practice the recycle rate would be set to provide dilution and cooling to control the reaction furnace temperature in the 2400°–2800° F. range. With this technique hydrogen sulfide feed and sulfur recovery capacity can be increased by 50–100% by enriching the air stream to 70 mole % oxygen when handling 90 mole % hydrogen sulfide acid gas feed.

By recycling a portion of the reacted and cooled reaction furnace stage sulfur condenser effluent gas to the input of the reaction furnace, particularly at the acid gas feed line to the burner, the flame temperatures associated with very high oxygen enrichments necessary to effect significant throughput increases are moderated by the relatively cool and reacted recycle gas emanating from the condenser. Alternately, the recycle could be added directly to the burner or to the air feed. The combination of oxygen enrichment and this intermediate recycle provides an unexpected potential enhancement of capacity or throughput for a Claus plant. Such a process configuration could be provided as a retrofit to a capacity limited existing Claus plant system or it could be provided in a smaller size new installation taking into account the increased capacity freedom provided by the oxygen enrichment and intermediate recycle attributes.

At first glance it may appear that the increased flow from the recycle stream will increase the Claus plant system pressure drop and reintroduce the pressure drop limitation which oxygen enrichment alleviated. This is not correct as can be seen from the Table which compares a bottlenecked air operation prior art system with the system debottlenecked using oxygen enrichment and intermediate recycle. The Table shows that going from the Case 1 bottlenecked air operation to the Case 2 debottlenecked oxygen with intermediate recycle operation, the reaction furnace pressure differential is increased from 1.9 to 2.8 psi for the debottlenecked Case 2. However, the catalytic stages and the tailgas unit pressure drops are reduced from 9.1 to 3.4 psi for Case 2 because of the decrease in nitrogen flow through the stages. At the same time, overall sulfur recovery in the Claus unit has increased from 97.7 to 98.3% for the debottlenecked Case 2. The tailgas unit recovery would also increase at the lower flow rates and longer contact times.

While this discussion has shown that oxygen enrichment and the recycle technique of this invention can be used to increase the capacity of an existing plant, the same technique can be used in the design of new Claus sulfur recovery units to decrease the size of equipment required for a given capacity below what would be required for air operation. In particular, the reduction of air input with consequent decrease in nitrogen input decreases the size and cost of the TGCU.

TABLE

| Description | Case 1 Bottlenecked Air Operation | Case 2 Debottlenecked Enriched Air Operation |
|---|---|---|
| Sulfur Capacity, long tons/day | 130 | 200 |
| Air O$_2$ concentration, vol. % | 21 | 70 |
| ΔP Reaction Furnace Stages, P$_{14}$-P$_{40}$ | 1.9 | 2.8 |
| ΔP Catalytic Stages, P$_{40}$-P$_{106}$ | 5.1 | 1.9 |
| ΔP TGCU, P$_{106}$-P$_{atm}$ | 4.0 | 1.5 |
| ΔP Total | 11.0 | 6.2 |
| Inlet Pressure, psig | 11.0 | 6.2 |
| Sulfur Recovery, % | 97.7 | 98.3 |

The present invention will now be described in greater detail with reference to a preferred embodiment which is illustrated in the FIGURE. An acid gas feed stream is introduced into the Claus system in line 10 having a hydrogen sulfide content of 92 mole %. The feed is at a temperature of 100° F. and a pressure of 25 psia. A recycle stream in line 18 is introduced into the acid gas feed stream 10 wherein the recycle stream comprises predominantly steam with lesser amounts of nitrogen, hydrogen sulfide, sulfur dioxide, carbon dioxide and hydrogen. The recycle is at approximately 350° F. The mixed gas stream is introduced into burner 20 along with air provided in line 14 at elevated pressure from compressor 16, as well as an oxygen stream 12 provided from any convenient source of commercially pure oxygen. The reactants are combusted in burner 20 and evolved into the reaction furnace 22 where the reactions of the Claus process occur. Specifically, in the burner hydrogen sulfide and oxygen combine to produce sulfur dioxide and water wherein one third of the reaction feed is initially combusted and the remaining two thirds react with the sulfur dioxide produced to produce sulfur and water according to the following formulaes:

$$H_2S + 3/2O_2 \rightarrow SO_2 + H_2O$$

$$2H_2S + SO_2 \rightarrow 3/2S_2 + 2H_2O$$

Some hydrogen is also produced by hydrogen sulfide dissociation.

$$2H_2S \rightarrow 2H_2 + S_2$$

The reactor furnace effluent then passes through a circuitous heat exchange zone or waste heat boiler 24 wherein the combustion effluents are cooled against boiler feed water in line 26 which then produces steam in line 28. In the waste heat boiler 24 the reaction effluents are converted from one form of sulfur species to another according to the following equations:

$$S_2 \rightarrow \tfrac{1}{3}S_6$$

$$S_2 \rightarrow \tfrac{1}{4}S_8$$

The cooled effluent from the waste heat boiler in line 30 is at a temperature of 600° F. and a pressure of 24 psia. It is then introduced into the first condenser 32 wherein the effluent is again heat exchanged to cool the effluent against boiler feed water in line 34 which produces steam in line 36. Liquid sulfur is condensed out in line 38 constituting 77.4% of the sulfur in the feed, and the gaseous combustion effluent stream is removed in line 40. Approximately 45% of the effluent stream 40 is then split into line 44 as an intermediate recycle stream taken immediately downstream from the condenser 32 and recycled through blower 46 to be fed in line 18 into the acid gas feed line 10 in order to moderate the temperature of the flame in the burner 20. This stream again is at a temperature of 350° F. Alternately, stream 18 can be introduced into burner 20, line 12 or line 14.

The remaining stream in line 42 is then reheated in a reheater heat exchanger 48 against process steam. The stream now in line 50 has been reheated to a temperature of 430° F. and is then introduced into a catalytic converter reactor 52 wherein additional quantities of hydrogen sulfide and sulfur dioxide are reacted to produce sulfur and water according to the following equations:

$$2H_2S + SO_2 \rightarrow 3/6S_6 + H_2O$$

$$2H_2S + SO_2 \rightarrow \tfrac{2}{8}S_8 + 2H_2O$$

The reacted stream now in line 54 is introduced into a second condenser 56 which again cools the effluent stream against boiler feed water in line 58 to produce additional steam in line 60. Additional elemental sulfur is recovered in line 62 constituting 14.3% of the sulfur in the feed to the process, wherein the sulfur species produced in the catalytic reaction are converted to high molecular weight sulfur species and then are condensed to elemental sulfur according the following reactions:

$$S_6 \rightarrow 6S_1$$

$$S_8 \rightarrow 8S_1$$

The stream in line 64 is at a temperature of 340° F. and a pressure of 22 psia. It is introduced into reheater heat exchanger 66 and heated against process steam to produce a stream in line 68 at 420° F. This stream is introduced into a second catalytic converter 70 wherein a similar catalytic reaction between hydrogen sulfide and sulfur dioxide occurs with the catalytic effluent in line 72 going to yet another condenser 74 which is cooled with boiler feed water 76 to produce steam in line 78. An additional quantity of liquid elemental sulfur is removed in line 80 constituting 4.9% of the sulfur in the feed to the process.

The effluent stream in line 82 is at 330° F. and 20 psia before it is further reheated in reheater heat exchanger 84 against process steam to produce a stream in line 86 at 400° F. and 20 psia. This stream is introduced into the third and final catalytic reactor 88 to react substantially the remaining hydrogen sulfide and sulfur dioxide to produce sulfur species which are removed in line 90 wherein that stream is introduced into a condenser 92 cooled by boiler feed water in line 94 producing steam in line 96. Further elemental sulfur in liquid form is removed in line 98 constituting 1.7% of the sulfur in the feed to the process, while a final effluent is recovered in line 100 comprising predominantly steam, nitrogen, carbon dioxide, hydrogen and residual hydrogen sulfide and sulfur compounds amounting to 1.4 mole % of the effluent stream.

The stream in line 100 is introduced into a tailgas coalescer 102 wherein additional sulfur is removed in line 104. The residual stream in lines 106 and 107 is then introduced into a tailgas cleaning unit (TGCU) where the bulk of the residual sulfur constituents of 106 are recovered to meet sulfur emission environmental standards typically by conversion to hydrogen sulfide which is returned to the acid gas feed 10. Alternately, the tail gas is sent to an incinerator burner 112 that is fired with natural gas in line 108 and air in line 110. The materials are then vented in stack 114, at an acceptable sulfur content level, as an effluent 116 to the atmosphere.

The present invention as described above is exemplary of only one embodiment of the invention which incorporates oxygen enrichment with an intermediate recycle stream to provide: (a) an unexpected degree of freedom in oxygen enrichment, (b) an increase in throughput of a Claus plant to very high levels, (c) a decrease in overall pressure drop through the Claus plant system, (d) reduced effluent flow to and through the tailgas process unit, and (e) heightened percent recovery of sulfur from the feed gas stream, wherein the intermediate recycle provides a unique moderation of flame temperatures in an oxygen enriched Claus plant.

The present invention has been described with regard to one preferred embodiment, but those skilled in the art will be capable of contemplating other variants which are deemed to be within the scope of the invention, which scope should be ascertained from the claims which follow.

I claim:

1. In a process for recovering sulfur from a feed gas stream rich in hydrogen sulfide wherein the gas stream is partially combusted with an oxygen-enriched gas in a Claus reaction furnace zone, the combustion effluent is cooled with the attendant condensation and separation of sulfur in a first condensation zone and the remaining effluent stream is passed through at least one stage of reheating, conversion in a catalytic Claus reaction zone and cooling with attendant condensation and separation of sulfur in an additional condensation zone, the improvement comprising recycling a portion of the reacted effluent stream from the first condensation zone to the reaction furnace zone in order to moderate the temperature of the reaction furnace zone.

2. The process of claim 1 wherein three stages are used to process the remaining effluent stream.

3. The process of claim 1 wherein the feed gas stream has a hydrogen sulfide content in the range of 60 to 100 mole %.

4. The process of claim 1 wherein the feed gas stream has a hydrogen sulfide content of 80 to 100 mole %.

5. The process of claim 1 wherein the oxygen-enriched gas has an oxygen content of greater than 21 mole %.

6. The process of claim 1 wherein the oxygen-enriched gas has an oxygen content of 32 to 90 mole %.

7. The process of claim 1 wherein the recycle stream flowrate constitutes 5 to 60% of the combustion effluent stream.

8. The process of claim 1 wherein the temperature of the reaction furnace zone is in the range of 2400° to 2800° F.

9. In a system for recovering sulfur from a feed gas stream containing a significant amount of hydrogen sulfide by the Claus reaction including: a reaction furnace for partially combusting the feed gas stream with an oxygen-enriched gas, a first condensing means for cooling and condensing sulfur from the combustion effluent, at least one train comprising a reheater means, a catalytic Claus reactor and an additional condensing means for rewarming, further reacting and recovering sulfur from said effluent, the improvement comprising recycle means for recycling a portion of the reacted effluent stream from said first condensing means to said reaction furnace.

10. The system of claim 9 including three trains of reheater means, catalytic Claus reactor and additional condensing means.

11. The system of claim 9 wherein the recycle means constitutes a conduit and blower connected to the effluent outlet of the first condensing means and to the burner of the reaction furnace for returning effluent to the furnace.

12. The system of claim 9 including a tail gas cleanup means connected to the last train of the system to further reduce the sulfur content of the effluent.

* * * * *